(12) United States Patent
Kontkanen et al.

(10) Patent No.: US 6,873,325 B1
(45) Date of Patent: Mar. 29, 2005

(54) VISUALIZATION METHOD AND VISUALIZATION SYSTEM

(75) Inventors: Petri Tapani Kontkanen, Helsinki (FI); Jussi Mika Antero Lahtinen, Helsinki (FI); Petri Jukka Myllymäki, Helsinki (FI); Tomi Viljam Silander, Helsinki (FI); Henry Rainer Tirri, Helsinki (FI); Kimmo Antero Valtonen, Helsinki (FI)

(73) Assignee: Bayes Information Technology, Ltd., Helsinki (FI)

( * ) Notice: Subject to any disclaimer, the term of this patent is extended or adjusted under 35 U.S.C. 154(b) by 309 days.

(21) Appl. No.: 10/019,477

(22) PCT Filed: Jun. 30, 2000

(86) PCT No.: PCT/FI00/00603

§ 371 (c)(1),
(2), (4) Date: Apr. 25, 2002

(87) PCT Pub. No.: WO01/03053

PCT Pub. Date: Jan. 11, 2001

(30) Foreign Application Priority Data

Jun. 30, 1999 (FI) .................................................. 991490

(51) Int. Cl.[7] .............................................. G06T 17/00
(52) U.S. Cl. ...................................................... 345/440
(58) Field of Search ................................ 345/419, 440, 345/853, 952, 953, 966, 967, 968, 969; 382/190, 159; 707/7, 6, 101; 706/6, 48

(56) References Cited

U.S. PATENT DOCUMENTS

| | | | | | |
|---|---|---|---|---|---|
| 5,640,468 A | * | 6/1997 | Hsu | ............................ | 382/190 |
| 6,058,206 A | * | 5/2000 | Kortge | ........................ | 382/159 |
| 6,128,613 A | * | 10/2000 | Wong et al. | .................... | 707/7 |
| 6,192,360 B1 | * | 2/2001 | Dumais et al. | ................. | 707/6 |
| 6,292,771 B1 | * | 9/2001 | Haug et al. | ..................... | 704/9 |
| 6,466,929 B1 | * | 10/2002 | Brown et al. | .................. | 706/48 |
| 6,567,814 B1 | * | 5/2003 | Bankier et al. | ............. | 707/101 |

FOREIGN PATENT DOCUMENTS

| | | |
|---|---|---|
| EP | 0 863 469 | 9/1998 |
| WO | WO 93/00651 | 1/1993 |

OTHER PUBLICATIONS

Baxter, "A Bayesian/Information Theoretic Model of Bias Learning", 1996, ACM, pp 77–88.*

Silverman et al., "Bayesian Clustering for Unsupervised Estimation of Surface and Texture Models", 1988, IEEE Transactions on Pattern Analysis and Machine Intelligence, vol. 10 No. 4, pp 482–495.*

Cohen, "Drawing Graphs to Convey Proximity: An Incremental Arrangement Arrangement Method", 1997, ACM Transactions on Computer–Human Interaction, vol. 4, No. 3, pp 197–229.*

(Continued)

*Primary Examiner*—Almis R. Jankus
(74) *Attorney, Agent, or Firm*—Young & Thompson

(57) ABSTRACT

A method and system for transforming a multivariate data domain into a low-dimensional visual representation. Probabilistic models of the data domain are utilized, and at least one probabilistic model is used to produce at least one predictive distribution. The predictive distributions are used as inputs to the visualization process, where the multidimensional space is converted to a low-dimensional space. In this process data vectors are considered similar, for example, if the corresponding instances of a predictive distribution, conditioned with the variable value assignments found in the data vectors, are similar. Consequently, similarity is not defined directly using the physical properties of the data vectors, but indirectly through the probabilistic predictive model(s).

35 Claims, 3 Drawing Sheets

OTHER PUBLICATIONS

Wang et al., "A Protype Belief Network–based Expert System Shell", 1990, ACM, pp 509–518.*

Flagle, "The Perception of System and the Reduction of Uncertainty", 1987, ACM, pp 137–142.*

Fung et al., "An Architecture for Probabilistic Concept–Based Information Retrieval", 1990, ACM, pp 455–467.*

Chick, "Bayesian Analysis for Simulation Input and Output", 1997, Proceedings of the 1997 Winter Simulation Conference, pp 253–260.*

Muggleton, "Bayesian Inductive Logic Programming", 1994, ACM, pp 3–11.*

Petri Kontkanen et al., "BAYDA: Software for Bayesian Classification and Feature Selection," *Proceedings of the Fourth International Conference on Knowledge Discovery and Data Mining (KDD '98)*, ed. by R. Agrawal et al, 1998, pp. 254–258, AAAI Press, Menlo Park, CA, USA.

Yoh–Han Pao et al., "Visualization of Pattern Data Through Learning Of Non–Linear Variance–Conserving Dimension–Reduction Mapping," *Pattern Recognition*, V. 30, 1997, pp. 1705–1717.

John W. Sammon, Jr., "A Nonlinear Mapping for Data Structure Analysis," *IEEE Transactions on Computers*, vol. C–18, 1969, pp. 401–409.

\* cited by examiner

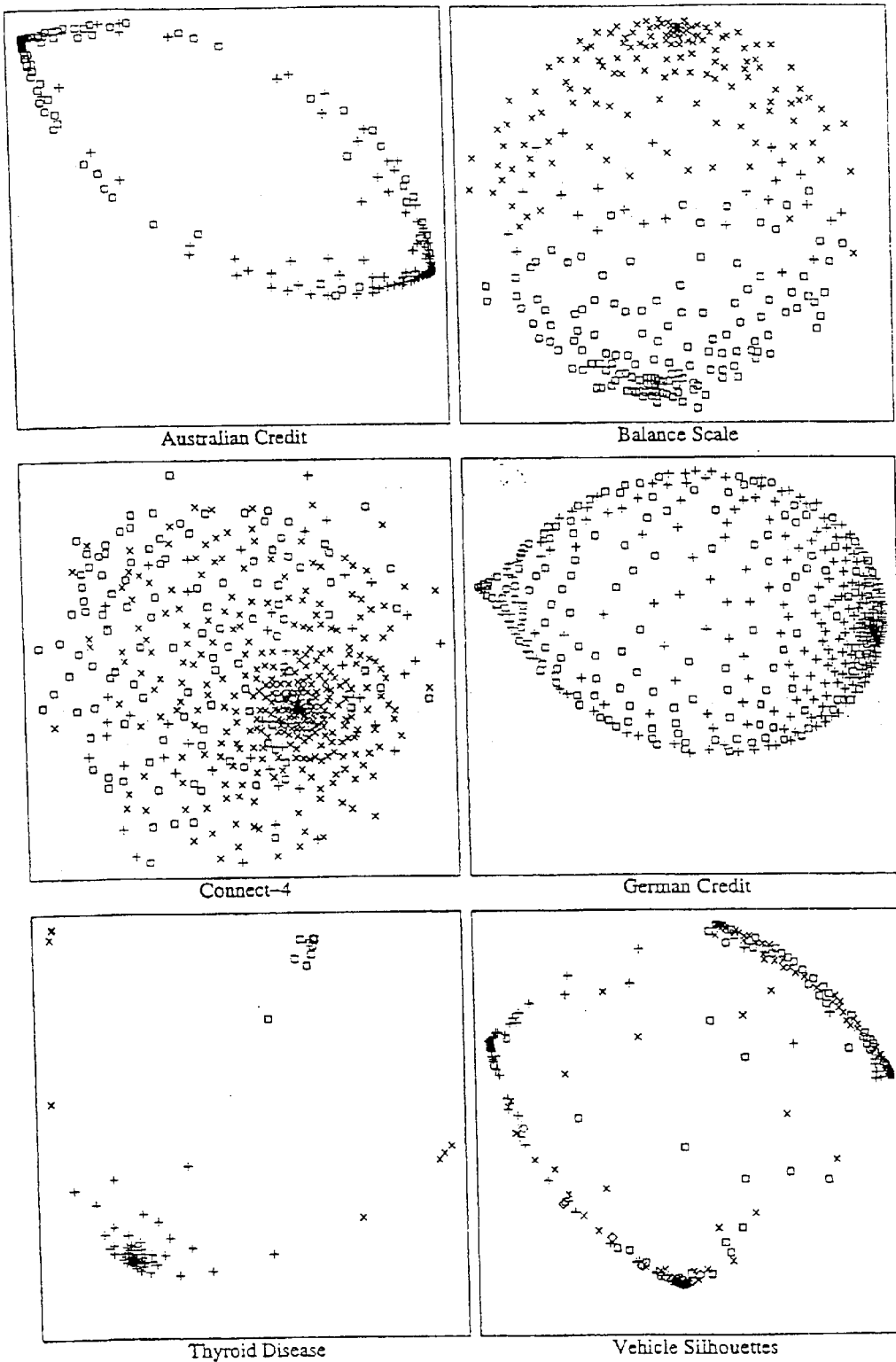
Figure 1: Examples of the two-dimensional visualizations obtained.

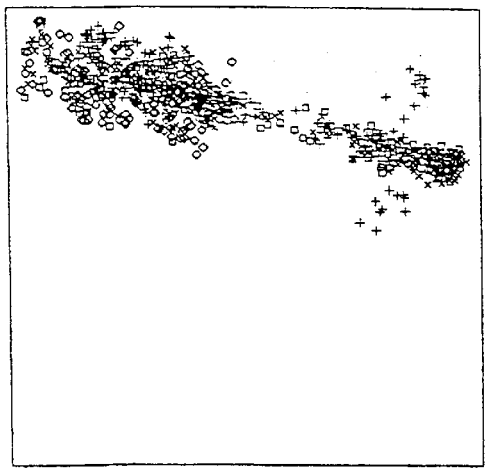
Vehicle Silhouettes
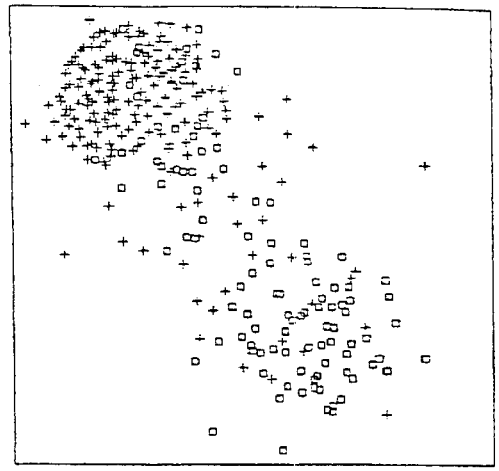
Heart Disease (Hungarian)
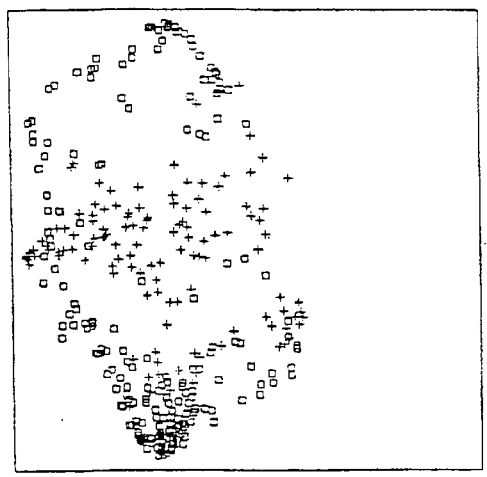
Ionosphere
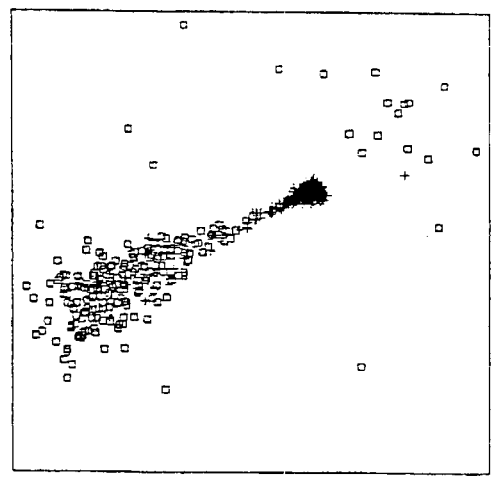
Breast Cancer (Wisconsin)
Fig. 3

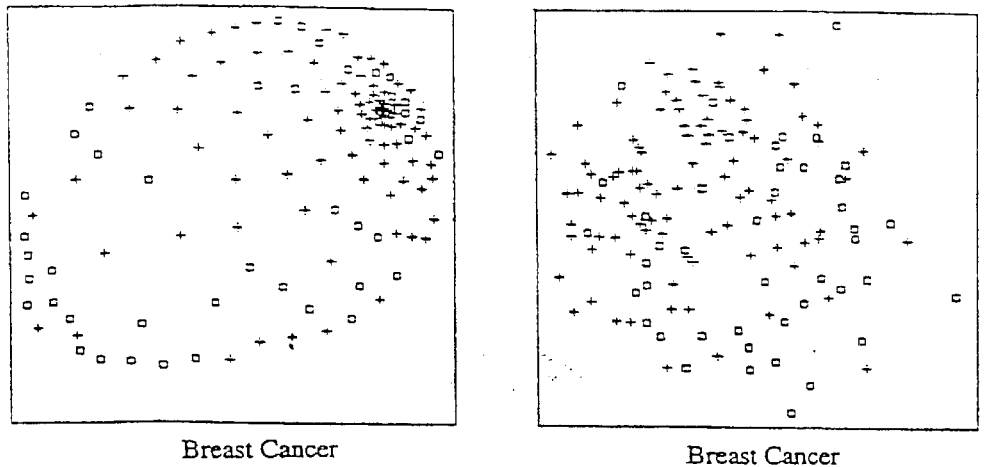
Fig. 2 An example of the difference in the quality of the images produced by the model-based (left) and Euclidean (right) visualization.
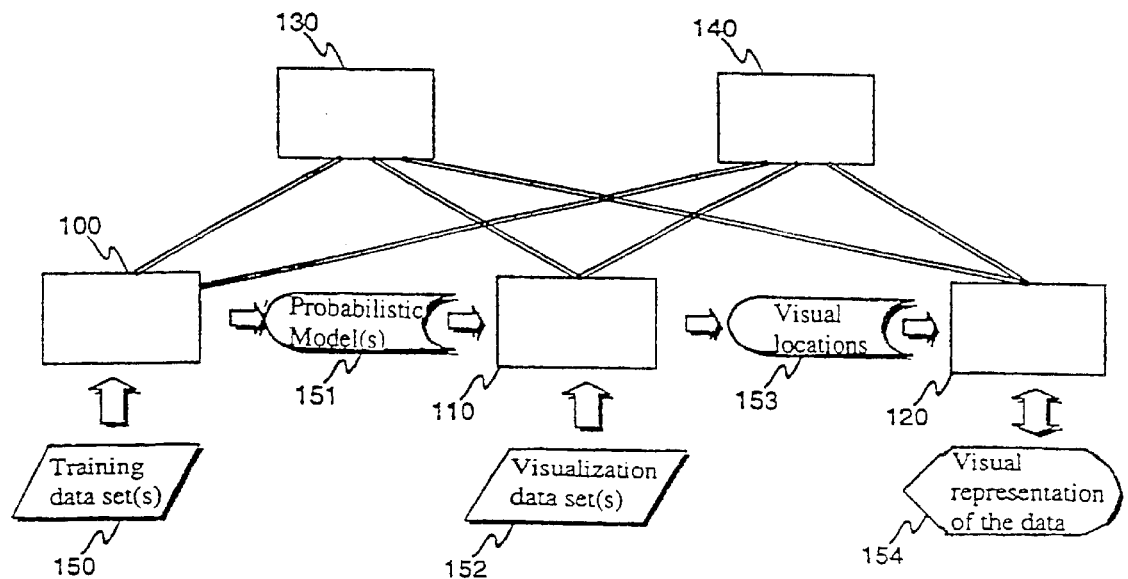
Fig. 4

VISUALIZATION METHOD AND VISUALIZATION SYSTEM

TECHNICAL FIELD OF THE INVENTION

The present invention relates to computerized system modeling, and more particularly to a method transforming a high-dimensional data domain into a low-dimensional visual representation. Specifically, the invention is directed to such a method as described in the preamble of claim 1.

BACKGROUND OF THE INVENTION

Computer visualization tools are needed for presenting the results of ever increasing amounts of processed data. The conventional approach is to take some few variables at a time, process them and their relations, for example, with a spreadsheet, and display the result, for example, as bar charts and die charts. In a complex domain, where each data point may have several attributes, this conventional approach produces typically a great number of charts, with a very weak connection to each other. The charts are typically presented in as a sequence of charts. From such a sequence of charts it is usually very difficult to see and comprehend the overall significance of the results. In a more advanced case the data is processed instead of a spreadsheet with more elaborate techniques, such as statistical methods or neural networks, but the results are still typically presented in sequential form using conventional charts.

In the following description a term data vector having a certain number of components refers to a data point having a certain number of attributes. The attributes/components may have continuous or discrete numerical values or they can have ordinal or nominal values. The data vectors are vectors of a data domain or a data space. In a visualization process, high-dimensional data vectors are displayed using typically a two- or three-dimensional device. A corresponding visualization vector having usually two or three coordinates, which determine the location of a point representing the data vector on the display device, is determined typically for each data vector.

Efforts exist to display data in low-dimensional presentation using, for example, conventional scatter plots that visually represent data vectors as graphical objects plotted along one, two, or three axes. If each data vector has a great number of components, which are usually called attributes, problems are encountered since besides the three dimensions offered by a three-dimensional display, only a few additional dimensions can be represented in this manner by using, for example, color and shape variations when representing the data.

Another even more significant limitation concerns the use of more elaborate conventional data dimension reduction methods that can be used to define a visualization vector for a data vector. The goal is to replace the original high-dimensional data vectors with much shorter vectors, while losing as little information as possible. Consequently, a pragmatically sensible data reduction scheme is such that when two data vectors are close to each other in the data space, the corresponding visualization vectors are also close to each other in the visualization space. Traditionally the closeness of data vectors in the data space is in these methods defined via a geometric distance measure such as the Euclidean distance. The attributes of the data can be various and heterogeneous, and therefore various dimension of the data space can have different scaling and meaning. The geometric distances between the data vectors do not properly reflect the properties of complex data domains, where the data typically is not coded in a geometric or spatial form. In this type of domains, changing one bit in a vector may totally change the relevance of the vector, and make it in some sense a quite different vector, although geometrically the difference is only one bit. For example, as many data sets contain nominal or ordinal attributes, this means that some of the data vector components have nominal or ordinal values, and finding a reasonable coding with respect a geometric distance metric, for example the Euclidean distance metric, is a difficult task. In a Geometric distance metric, all attributes (vector components) are treated as equal. Therefore it is obvious that an attribute with a scale of, say, between −1000 and 1000, is more influential than an attribute with a range between −1 and 1. To circumvent this problem, the attributes can of course be normalized, but it is not at all clear what is the optimal way to implement the normalization. In addition, in real-world situations the similarity of two vectors is not a universal property, but depends on the specific focus of the user: even if two vectors can be regarded as similar from one point of view, they may appear quite dissimilar from another point of view.

A third significant limitation is related to data mining. Data mining is a process that uses specific techniques to find patterns in data, allowing a user to conduct a relatively broad search in databases for relevant information that may not be explicitly stored in the data. In a typical data mining process, a user initially specifies a search phrase or strategy and the system then extracts patterns and relations corresponding to that strategy, from the stored data. It usually takes some time for extracting the patterns, and therefore the extracted patterns and relations are presented to the user by a data analyst with a delay. The probably invoked new requests cause a new processing cycle with a relatively long time delay. There is thus a need for a data visualization tool/method that visually approximates in one instance the whole data domain although it includes a large number of variables. Furthermore, there is need for a tool/method where the results of the data mining process are visualized instantly and the data mining process is typically carried out in one session.

SUMMARY OF THE INVENTION

An object of the invention is to realize a flexible visualization method. A further object of the invention is to realize a method, which is able to handle heterogeneous data straightforwardly and enables the visualization of heterogeneous data.

Objects of the invention are achieved by constructing a set of probabilistic models, generating predictive distributions from this set of probabilistic models, and determining visualization vectors corresponding to the data vectors using the predictive distributions.

The method according to the invention is a method for generating visual representations of multidimensional data domains, which method comprises the steps of:
  selecting data to be visualized from at least one data source, and
  choosing the number of dimensions to be used in the visualization,
and which method is characterized in that it further comprises the steps of:
  constructing a set of probabilistic models,
  generating a set of predictive distributions from said set of probabilistic models, and using at least one predictive distribution belonging to said set of predictive distributions, determining a visual location for each data vector to be visualized.

The dependent claims describe further advantageous embodiments of the invention.

The present invention is a method for transforming a multivariate data domain into a visual low-dimensional representation. The method utilizes probabilistic models of the data domain. A probabilistic model is a model, which associates with each point of the data domain a certain probability. In a method according to the invention, there may be a certain set of predetermined models, and the construction of a set of probabilistic models for a certain visualization process may mean, for example, the selection of models describing the data domain from the set of predetermined models. The selection of models, or more generally the construction of models, can involve the use of a training data set, some expert knowledge of the data domain and/or some logical constraints.

In the visualization process the multidimensional space is converted to a low-dimensional space, using, a transformation, which maps each data vector in the domain space to a vector in a visual space having a lower dimension. The visual space typically has one, two or three dimensions. Typically it is required that the transformation is such that when two vectors are close to each other in the domain space, the corresponding vectors in the visual space are also close to each other. In a method according to the invention, usually an Euclidean distance is used to define the distance between vectors in the visual space, and the distance between vectors in the domain space is typically defined using at least one predictive distribution derived from the constructed probabilistic model. At least one of the constructed models is thus directly used in the visualization process to produce the predictive distribution(s).

The set of probabilistic models may consist of one or more probabilistic models. Similarly, the set of predictive distributions may consist of one or more predictive distributions. If more than one predictive distributions are generated, they may relate to one or more of the constructed probabilistic models. It is, for example, possible to have one constructed model and derive two predictive distributions from said model. A second example is to have two constructed models and two predictive distributions, where a first predictive distribution relates to one constructed model and a second predictive distribution relates to the other constructed model.

In a method according to the invention, the predictive distribution is used as input to the visualization process, where the visualization vectors corresponding to the data vectors are calculated. The predictive distribution can, for example, be used in estimating how close two data vectors are to each other. In a method according to the invention, similarity of data vectors (or, in other words, distance between data vectors) is not defined directly using the values of the components of the data vectors, but indirectly through the probabilistic predictive model(s). This allows the use of heterogeneous data (with both continuous and discrete attributes with different value ranges) in a theoretically solid manner without need for heuristic scaling and normalization schemes in data preprocessing.

Consider an example of using one predictive distribution in determining a distance between two data vectors. Two data vectors in the domain space may be considered similar if they lead to similar predictions, when the data vectors are given as inputs to the constructed model. Typically a first instance of the predictive distribution relating to a first data vector in the domain space is calculated, and a second instance predictive distribution relating to a second data vector in the domain space is calculated. The distance between the first and the second data vector in the domain space depends on the similarity of the first and second instances of the predictive distribution, in other words it depends on the distance between the first and second instances of the predictive distribution. Various distance metrics, where the distance between data vectors is determined using instances of the predictive distribution, are discussed in the detail description of the invention.

In a method according to the invention, the predictive distribution corresponding to a data vector is typically a predictive distribution conditioned with the values of some components of the data vector. The data attributes, whose values are not used as conditions, are called target attributes. In a method according to the invention it is thus possible to change the focus of the visualization by changing the target attributes. A method according to the invention may thus be a supervised data visualization method. This is very useful, for example, when a user knows in which data attributes he is interested in and can select these attributes as target attributes. Alternatively, it is possible to use an unsupervised probabilistic model and use a distance metric that does not involve a selection of certain target attributes. In this case, the visualization method according to the invention is an unsupervised method. When an unsupervised visualization method is used, the user does not have to select any data attribute as target attribute. This is an advantage, for example, when among the data attributes there is no natural candidate for the target attribute. It is possible, for example, to make an unsupervised visualization work automatically, so that constructs the probabilistic model(s) using the data and then visualizes the data without a user intervening the visualization.

Typically after the Visual locations corresponding to the data vectors are determined, a visual representation of the data domain is generated using the determined visual locations. In addition to plain visualization a method according to the invention is very suitable for data mining, where domain experts try to capture interesting regularities from the visual image. Because at least one predictive distribution is used in determining the visual locations, visualization according to the invention often efficiently reveals hidden structures in the data. In data mining, it is furthermore possible to view visualizations that relate to various target attribute sets, i.e. to various predictive distributions.

In a method according to the invention, at least one probabilistic model is constructed and it may be stored for further use. Especially if the probabilistic model is a Bayesian model, it is quite straightforward to produce predictive distributions using the probabilistic model.

The present invention provides procedures for visually displacing and manipulating multi-dimensional data with, for example, the following advantages. Data visualization can be simplified as the visualization result is topically a two or three-dimensional plot. Information can be synthesized from data, as the visualization results may reveal hidden structures of the data, and at least partly as a result of the revealed structures, decision making can be simplified. Trends and data relationships can be more easily visualized and uncovered, for example, using various colors and/or markers are used to mark different attribute values in the visual representation. Furthermore, report generation can be simplified, and data administration can be performed more easily and understandably when one understands the domain better.

The invention relates also to a visualization system, which comprises means for receiving data to be visualize, and which is characterized in that it further comprises means for constructing a set of probabilistic models using predetermined probabilistic model structures, means for generating a set of predictive distributions from said set of probabilistic models, means for determining, using at least one predictive distribution belonging to said set of predictive distributions, visual locations for data vectors, which constitute at least part of the data to be visualized, and means for producing a visualization using said visual locations.

BRIEF DESCRIPTION OF THE DRAWINGS

The invention is described in more detail in the following with reference to the accompanying drawings, of which FIG. 1 illustrates examples of visualization results produced by a method according to a first advantageous embodiment of the invention.

FIG. 2 illustrates first visualization results produced by a method according to the first advantageous embodiment of the invention and second visualization results produced using a conventional visualization method, FIG. 3 illustrates examples of visualization results produced by a method according to a second advantageous embodiment of the invention, and FIG. 4 illustrates a diagram of a system, which is an example of a system according to the present invention.

DETAILED DESCRIPTION

In the following description letter M refers to a probabilistic model, which associates with each point of the data domain a certain probability. In other words, the model M relates to a probability distribution $P(X_1, \ldots, X_n|M)$ on the space of possible data vectors x, where a data vector has n attributes/components $X_i$. A typical example of a probabilistic model is a parametric model where $\mathcal{M}$ is the structure of the model and $\theta$ represents the parameters of the model. In this case, each parameterized instance $(\mathcal{M}, \theta)$ of the parametric model produces a probability distribution $P(X_1, \ldots, X_n|\mathcal{M}, \theta)$.

A probabilistic model used in a method according to the invention may be a supervised model or an unsupervised model. A supervised model means that, for example, one of the data attributes is selected as a class attribute, which is the focus of the visualization. In supervised models, the target attributes are thus typically selected already when the model is constructed. In unsupervised models it is not necessary to decide the target attributes when the model is constructed; they can be selected when the distances between the data vectors are determined.

The probabilistic model M used in a method according to the invention may belong to a family of models known as Bayesian (belief) network models. A Bayesian network is a representation of a probability distribution over a set of (typically) discrete variables, consisting of an acyclic directed graph, where the nodes correspond to domain variables, and the arcs define a set of independence assumptions which allow the joint probability distribution for a data vector to be factorized as a product of simple conditional probabilities. For an introduction to Bayesian network models, see e.g., (Pearl, 1988). One example of a Bayes network model, which can be used in a method according to the invention, is the naive Bayes model. The naive Bayes model is a supervised model, where one of the data attributes is selected as a class variable. A description of the naive Bayes model can be found, for example, in (Kontkanen, Myllymäki, Silander, Tirri, 1998). A further example of a probabilistic model usable in a method according to the invention is a model belonging to a family of mixtures of Bayesian network models. A mixture of Bayesian network models is a weighted sum of several Bayesian network models.

A training set of sample data, or many training sets from one or more data sources, can be used in constructing the probabilistic model(s). In case of parametric models, for example, construction of a model refers to selecting a suitable model structure and suitable parameters for the selected model structure. Theoretically justifiable techniques for learning models from sample data are discussed in (Heckerman, 1996). It is also possible to use, alternatively or in addition to a training set, further information about the data domain. For example, the model construction may be based at least partly on knowledge about the problem domain represented as prior distributions and/or as logical constraints. Ashen a training set is used, it is possible to use, for example, part of the data to be visualized as a training set and still use the whole data in the visualization process. In other words, it is possible that the training set is a subset of the data to be visualized. Furthermore, it is possible that data to be visualized is a subset of the training set or that the training set consists of the data to be visualized.

It is possible to produce predictive distributions given a probabilistic model. A predictive distribution may be a conditional distribution for one or more of the domain attributes $X_i$ given the other attributes. Let $X=\{x_1, \ldots, x_N\}$ denote a data matrix having N data vectors $x_i$. Each data vector consists of n components, in other words the data has n attributes $X_1, \ldots X_n$. For simplicity, in the sequel we will assume the attributes $X_i$ to be discrete. Let us assume that we Irish to visualize data with respect to m target attributes $X_1, \ldots, X_m$. In this case the predictive distribution is typically a conditional predictive distribution $$P(X_1, \ldots, X_m|x^C, M) = P(X_1, \ldots, X_m|X_{m+1}=x_{m+1}, \ldots, X_n=x_n, M),$$

where M is a constructed model, $x_i$ is the value of the attribute $X_i$ in data vector x, and $x^C$ denotes that the values of those attributes, which are outside the target set $X_1, \ldots, X_m$, are assumed to have the attribute values of data vector x. The number of target attributes can be, for example, one, i.e. m=1. If, for example, the naive Bayes model is used, the target set typically consists of the class attribute.

For a given a data vector $x_i$ it is possible to compute an instance of the predictive distribution. For example, an instance of the conditional predictive distribution is $$P(X_1, \ldots, X_m|x_i^C, M) = P(X_1, \ldots X_m|X_{m+1}=x_{m+1}^i, \ldots, X_n=x_n^i, M)(1)$$

where $x_k^i$ is the value of attribute $X_k$ in data vector $x_i$. The instance of the predictive distribution means that a conditional probability (where the values of the other attributes are as indicated above) is associated with each possible value $x_{k1}, x_{k2}, \ldots$ of each target attribute $X_k$.

If a constructed probabilistic model involves one or more latent attributes, the predictive distribution may be a conditional distribution for one or more latent attributes, given the constructed model. Furthermore, the predictive distribution may be a combination of a conditional distribution for at least one domain attribute and a conditional distribution for one or more latent attributes.

Let X' denote a visualization matrix where each n-component data vector $x_i$ is replaced by a typically two or three-component visualization vector $x_i'$. Such a visualization matrix X' can easily be plotted on a two- or three-dimensional display. Consequently, for visualizing high-dimensional data, we need to find a transformation (function), which maps each data vector in the domain space to a vector in the visual space. In order to have a meaningful visualization for two data vectors, which are close to each other in the domain space, the corresponding visualization vectors should be close to each other in the visualization space.

One way to determine the visual locations (visualization vectors) is to determine them using pairwise distances between the data vectors to be visualized. Let us note the distance between between data vectors $x_i$ and $x_j$ in the domain space with $d(x_i, x_j)$ and the distance between the corresponding visualization vectors $x_i'$ and $x_j'$ in the visual space with $d'(x_i', x_j')$. It is possible, for example, to find a best visualization matrix X' in least-square sense by minimizing the sum of the squares of the distance differences $d(x_i, x_j)-d'(x_i', x_j')$. This is called Sammon's mapping (see (Kohonen, 1995)). Formally, we can express this requirement, for example, in the following manners:

$$\text{Minimize} \sum_{i=1}^{N} \sum_{j=i+1}^{N} (d(x_i, x_j) - d'(x_i', x_j'))^2 \text{ or} \quad (2)$$

$$\text{Minimize} \frac{1}{\sum_{i=1}^{N} \sum_{j=i+1}^{N} d(x_i, x_j)} \sum_{i=1}^{N} \sum_{j=i+1}^{N} \frac{(d(x_i, x_j) - d'(x_i', x_j'))^2}{d(x_i, x_j)}.$$

In a method according to the invention, a criterion presented above is often minimized, but it is possible to find visualization vectors also using other criterion.

The geometric Euclidean distance seems a natural choice for the distance metric $d'(\cdot)$ in the visualization space, but this distance measure typically does not make a good similarity metric in the high-dimensional domain space. In many complex domains geometric distance measures reflect poorly the significant similarities and differences between the data vectors. In a method according to the invention, if the pairwise distances between data vectors are computed, they are computed by using at least one predictive distribution generated from a constructed probabilistic model M. Two vectors are typically considered similar if their lead to similar predictions, when given as input to the same probabilistic model M. For example, data vectors $x_i$ and $x_j$ can be considered similar, if the corresponding instances of a predictive distribution, i.e. $P(X_1, \ldots, X_m|x_i^C, M)$ and $P(X_1, \ldots, X_m|x_j^C, M)$, are similar. A distance metric, which involves a predictive distribution or predictive distributions, is typically scale invariant as we have moved from the original attribute space to the probability space. This also allows us to handle different type of attributes (discrete or continuous) in the same consistent framework. Furthermore, the framework is theoretically on a more solid basis as our domain assumptions must be formalized in the model M.

There are various ways to define a similarity measure between, for example, two instances of a predictive distribution. In a method according to one embodiment of the invention, the following distance metric is used:

$$d(x_i, x_j) = 1.0 - P(MAP(x_i) = MAP(x_j)) \quad (3)$$

where $MAP(x_i)$ denotes the maximum posterior probability (MAP) assignment for the target attributes $X_1, \ldots, X_m$ with respect to the selected predictive distribution, for example a predictive distribution presented in Equation 1. Of all the possible value combinations for the target attributes, the MAP assignment is the one with the highest probability. For example, if there is only one target attribute $X_1$, a conditional predictive distribution $P(X_1|x^C)$ associates probabilities for each possible value $x_{11}, x_{12}, \ldots$ of the target attribute $X_1$ and MAP assignment for the target attribute $X_1$ is the value $x_{1k}$ having the highest probability. In other words, $P(MAP(x_i)=MAP(x_j))$ is the probability that the values of the target attributes in data vector xi are the same as the values of the target attributes in data vector $x_j$, when the values of the attributes outside the target set are assumed to have the values they have in $x_i$ and $x_j$. Consider again the above example involving one target attribute $X_1$. In this case, a first instance $P(X_1|x_i^C)$ of the predictive distribution associates first probabilities $(P_{i1}, P_{i2}, \ldots)$ and a second instance $P(X_1|x_j^C)$ of the predictive distribution associates second probabilities $(P_{j1}, P_{j2}, \ldots)$ for each possible value $x_{11}, x_{12}, \ldots$ of the target attribute $X_1$, and $P(MAP(x_i)=MAP(x_j))=P_{i1}P_{j1}+P_{i2}P_{j2}+\ldots$. A further wording for the distance metric in Equation 3 is that it is the probability that a first random outcome drawn from a first instance $P(X_1, \ldots, X_m|x_i^C)$ of a predictive distribution is different from a second random outcome drawn from a second instance $P(X_1, \ldots, X_m|x_j^C)$ of the predictive distribution.

In a method according to a second embodiment of the invention, the pairwise distance between two data vectors $x_i$ and $x_j$ is defined by $$d(x_i, x_j) = -\log P(MAP(x_i)=MAP(x_j)), \quad (4)$$

where $MAP(x_i)$ denotes the maximum posterior probability assignment for the target attributes $X_1, \ldots, X_m$ with respect to the selected predictive distribution. Similarly as the distance metric defined in Equation 3, also here the distance between two data vectors $x_i$ and $x_j$ is determined using a first instance $P(X_1, \ldots, X_m|x_i^C)$ and a second instance $P(X_1, \ldots, X_m|x_j^C)$ of the selected predictive distribution. The distance metrics defined in Equations 3 and 4 are supervised, as some attributes are selected as target attributes. Consequently, a visualization method using either of these distance metrics is a supervised method.

It is possible to define the pairwise distances by using more than one conditional predictive distribution. In a method according to a third embodiment of the invention, the pairwise distance between two data vectors $x_i$ and $x_j$ is defined in the following way $$d(x_i, x_j) = -\sum_{k=1}^{n} \log P(MAP_k(x_i) = MAP_k(x_j)), \quad (5)$$

where $MAP_k$ denotes the maximum posterior probability value of target attribute $X_k$ with respect to predictive distribution $P(X_1|x^C)$. This means that each attribute $X_k$ is in turn selected as a target attribute in a conditional predictive distribution. The distance metric defined in Equation 5 is unsupervised, as all attributes are treated equally. When this metric is used with unsupervised models, it is usually enough to construct one model, as various conditional predictive distribution can be obtained from an unsupervised model. If this metric is used With supervised models, it may be necessary to construct several probabilistic models. For example, if the naive Bayes model is used, typically n models are constructed for a certain data domain, and in each model a different attribute is selected as the class variable. From each model it is then possible to obtain a conditional predictive distribution relating to the class variable. Preferably, when a distance metric defined in Equation 3, 4 or 5 is used, the visualization vectors are found using the Sammon's mapping.

In a method according to a fourth embodiment of the invention, the pairwise distance between two data vectors $x_i$ and $x_j$ is defined as the symmetric Kullback-Leibler-divergence (see, for example, (Gelman, Carlin, Stern, Rubin, 1995)) between a first instance $P(X_1, \ldots, X_m|x_i^C)$ and a second instance $P(X_1, \ldots, X_m|x_j^C)$ of the predictive distribution conditioned with the variable value assignments present in a data vector. A Kullback-Leibler divergence has an infinite range, which may lead to computational problems with practical implementations. Preferably, the visualization vectors are found minimizing Equation 2, in other word using the Sammon's mapping.

It is also possible to use a predictive distribution to define the visual locations directly. In a method according to a further embodiment of the invention, the visualization space is a space where each dimension represents directly a component of an instance of a predictive distribution. A component of an instance of a predictive distribution means here the probability that the target attributes have certain predetermined values, e.g. $X_1=x_{11}$ and $X_2=x_{12}$. In a three-dimensional visualization space, for example, a visualization vector $x'_i$ corresponding to a data vector $x_i$ could be $$x'_i=(P(X_1=x_{11}|x_i^C,M), P(X_1=x_{12}|x_i^C,M), P(X_1=x_{13}|x_i^C,M).$$

Here, for example, the first visual coordinate is the conditional probability that the attribute $X_1$ has the value $x_{11}$.

In a method according to a first advantageous embodiment of the invention, one probabilistic model, which is the naive Bayes model mentioned above, is constructed. By fixing the model structure to the naive Bayes model, the problem of searching for a good model structure is avoided. In many cases the naive Bayes model produces very good results, and it is computationally quite simple. The naive Bayes model is constructed, for example, using part of the available data as a training set and using the rest of the data in the visualization.

In a method according to the first advantageous embodiment, the class variable $X_n$ is used as the target attribute when the predictive distributions are calculated. Data vectors are thus visualized according to the classification distribution obtained by using the simple naive Bayesian network model.

In a method according to the first advantageous embodiment, the dimension of the visual space is two or three and the pairwise distance between data vectors in the data space is defined by Equation 3. For minimizing the criterion in Equation 2, any search algorithm can be used, for example the following very straightforward stochastic greedy algorithm is used. The algorithm starts with a random visualization X', changes a randomly selected visualization vector $x'_i$ to a randomly selected new visualization, and accepts the change if the value of criterion in Equation 2 is decreased. In other words, one visualization vector is changed at time. The new candidate visual vector are generated from a normal distribution centered around the current visual vector, which means that small moves are more likely to be suggested than large ones. This stepwise procedure is repeated, for example, one million times.

FIG. 1 presents six illustrative examples of the two-dimensional visualization produced using a method according to the first advantageous embodiment of the invention. Visualization vectors corresponding to data vectors having different class labels are indicated with different type of markers in FIG. 1. The dataset being visualized are publicly available classification datasets from UCI data repository (Blake, Keogh, Merz, 1998). In FIG. 1, visualizations of the following datasets are shown: Australian Credit, Balance Scale, Connect-4, German Credit, Thyroid disease and Vehicle Silhouettes.

As the names of these datasets indicate, the data shown in FIG. 1 is various: some datasets comprise information relating to the credit card owners, one comprises information about patients having a certain disease, and one comprises information about vehicle silhouettes. The visualizations in FIG. 1 show clearly structures in the data domains, and the visualization method according to the first advantageous embodiment of the invention can thus be used to visualize various data domains successfully.

FIG. 2 presents a comparative example, where a certain dataset (Breast Cancer from the UCI data repository) is visualized using a method according to the first advantageous embodiment of the invention (left-hand side panel of FIG. 2) and using an Euclidean visualization method, where the distance between the data vectors is the Euclidean distance (right-hand side panel of FIG. 2). In the Euclidean method, the Equation 2 is also minimized using a similar stochastic greedy algorithm as in a method according to the first advantageous embodiment of the invention and the number of steps in the algorithm is the same for both visualizations presented in FIG. 2.

As can be seen in FIG. 2, the Euclidean visualization produces a scattered image without any noticeable trends. The visualization, which is the result of a method according to a first advantageous embodiment of the invention, shows a clear structure. The method according to the first advantageous embodiment of the invention is thus more applicable to visualization and data mining than the Euclidean visualization and produces typically better results than the Euclidean visualization. A method according to the invention, where for example naive Bayes model, a single training set and a stochastic greedy algorithm are used, is quite simple and computationally comparative to, for example, conventional visualization schemes employing Euclidean distance metrics in the data domain. The visualization can be obtained quite fast. Furthermore, as a simple method according to the first advantageous embodiment produces already good visualizations, the quality of visualizations produces using, a method according to the invention can be further enhanced, for example, using a more versatile probabilistic model. In general, if the naive Bayes model is used, the Sammon's mapping requires most computing resources. If more versatile models are used, then the construction of the probabilistic model may require also quite much computing resources.

FIG. 3 presents four illustrative examples of the two-dimensional visualization produced using a method according to a second advantageous embodiment of the invention, where the unsupervised distance metrics defined in Equation 5 and naive Bayes model are used. As explained in connection with Equation 5, several naive Bayes models describing the data are constructed here. Visualization vectors corresponding to data vectors having different class labels are indicated with different type of markers in FIG. 3. The dataset being visualized are from UCI data repository. In FIG. 3, visualizations of the following datasets are shown: Breast Cancer (Wisconsin), Heart Disease (Hungarian), Ionosphere and Vehicle Silhouettes. As can be seen in FIG. 3, also an unsupervised visualization method according to the invention may clearly reveal hidden structures in data domains.

For the visualization examples presented in FIGS. 1, 2 and 3, part of the data sets derived from the UCI data repository is used as a training set. The training set is not included in the data to be visualized in FIGS. 1, 2 and 3.

In a further embodiment of the invention, the data to be visualized is data generated from said constructed model. This can be useful in e.g. domains where the amount of available data is so little that proper visualizations of the domains are hard to make. Generating data using the constructed probabilistic model, and then visualizing the generated data can also be used as a tool in gaining insight on the constructed probabilistic model.

The invention relates also to a computer system for visualizing multidimensional data. Preferably, the system comprises means for processing the data to achieve a model of the data domain, which can then be used for interactively developing and manipulating visual representations of the domain.

The implementation as a software tool advantageously comprises means for storing the probabilistic model structures, means for constructing a probabilistic model of the data domain using the stored probabilistic model structure, as well as means for using the constructed model in a visualization process as described previously. The visual representation can be physically embodied in a computer-readable medium for visualization on a computer display device.

In a visualization system according to the invention, the stored probabilistic model structures may be any model structures discussed above, and the construction of the probabilistic model and the determining of the visual locations may be performed using any methods described above.

FIG. 4 illustrates a third advantageous embodiment of the invention. FIG. 4 shows, how various components of a computer system interact providing the functionality of the inventive method. According to FIG. 4, the computer system comprises means 100 for model construction, means 110 for location determination, means 120 for data visualization, means 130 for providing a user interface, and a processing unit 140.

The means 130 for providing a user interface may for example comprise a display unit, a keyboard, a pointing device such as a mouse, and any other typical user interface elements of a computer system. The means 100 for model construction, means 110 for location determination, and means 120 for data visualization can advantageously be realized as program instructions stored in a memory medium and executed by the processing unit 140.

According to the third advantageous embodiment of the invention, for producing at least one probabilistic model 151 one or more training data sets 150 may be used as inputs for the means 100 for model construction. The means for model construction 100 may comprise, for example, a certain set of predefined structures of parametric models and means for selecting a proper model structure and suitable parameters for the selected model structure. The probabilistic model or models 151 and at least one visualization data set 152 are input into means 110 for location determination for producing visual location data 153. The visual location data 153 is input into means 120 for data visualization for producing a visual representation of data.

Preferably, the data is Visualized on a display device by using the visual locations determined according to the inventive method. Preferably, the computer system further comprises means for allowing-the user to manipulate the visual presentation according to different domain variable characteristics by using for example colors, shapes and animation. Preferably, the visual display functions also as an interface to the data to be visualized so that the user can study the contents of the original data vector through the corresponding visual location in the visual representation. This means that, for example, by pointing a certain visual location in a display device with a mouse, the attributes of the corresponding data vector are shown to the user.

In view of the foregoing description it will be evident to a person skilled in the art that various modifications may be made within the scope of the invention. While advantageous embodiments of the invention have been described in detail, it should be apparent that many modifications and variations thereto are possible, all of which fall within the true spirit and scope of the invention.

References

Blake, C., Keog, E., & Merz, C. (1998). *UCI repository of machine learning databases*. (URL: ~http://www.ics.uci.edu/-mlearn/MLRepository.html)

Gelman, A., Carlin, J., Stern, H., & Rubin, D. (1995). *Bayesian data analysis*. Chapman ~& Hall.

Heckerman, D. (1996). *A tutorial on learning with Bayesian networks* (Tech. Rep. No. S4SR-TR95-06). One Microsoft Way, Redmond, Wash. 98052: Microsoft Research, Advanced Technology Division.

Kohonen, T. (1995). *Self-organizing maps*. Berlin: Springer-Verlag.

Kontkanen, P., Myllymäki, P., Silander, T., & Tirri, H. (1998). BAYDA: Software for Bayesian classification and feature selection. In R. Agrawal, P. Stolorz, & G. Piatetsky-Shapiro (EAs.), *Proceedings of the fourth international conference on knowledge discovery and data mining* (KDD-98) (pp. 254–258). AAAI Press, Menlo Park.

Pearl, J. (1988). *Probabilistic reasoning in intelligent systems: Networks of plausible inference*. Morgan Kaufmann Publishers, San Mateo, Calif.

What is claimed is:

1. Method for generating visual representations of multidimensional data domains, which method comprises the steps of:
   selecting data to be visualized from at least one data source, and
   choosing the number of dimensions to be used in the visualization, characterized in that the method further comprises the steps of:
   constructing a set of probabilistic models,
   generating a set of predictive distributions from said set of probabilistic models, and
   using at least one predictive distribution belonging to said set of predictive distributions, determining a visual location for each data vector to be visualized.

2. A method according to claim 1, characterized in that it further comprises the step of storing at least one probabilistic model belonging to said set of probabilistic models.

3. A method according to claim 1, characterized in that it further comprises the step of generating a visual representation of the data domain using said determined visual locations.

4. Method according to claim 1, characterized in that in said step of constructing a set of probabilistic models, the model construction is based at least partly on a set of sample data from said at least one data source.

5. Method according to claim 4, characterized in that said set of sample data is a set of data consisting of the data selected in said step of selecting data to be visualized.

6. Method according to claim 4, characterized in that said set of sample data is a subset of the data selected in said step of selecting data to be visualized.

7. Method according to claim 4, characterized in that in said step of selecting data to be visualized, a subset of said set of sample data is selected.

8. Method according to claim 1, characterized in that in said step of constructing a set of probabilistic models, the model construction is based at least partly on knowledge about the problem domain represented as prior distributions.

9. Method according to claim 1, characterized in that in said step of constructing a set of probabilistic models, the model construction is based at least partly on knowledge about the problem domain represented as logical constraints.

10. Method according to claim 1, characterized in that at least one probabilistic model belonging to said set of probabilistic models belongs to the family of models known as Bayesian networks.

11. Method according to claim 1, characterized in that at least one probabilistic model belonging to said set of probabilistic models belongs to the family of mixtures of Bayesian network models.

12. Method according to claim 1, characterized in that it further comprises of step of generating data using at least one probabilistic model belonging to said set of probabilistic models, and in that in said step of selecting data to be visualized, said generated data is selected.

13. Method according to claim 1, characterized in that at least one predictive distribution belonging to said set, of predictive distributions is the conditional distribution for at least one domain attribute.

14. Method according to claim 1, characterized in that at least one predictive distribution belonging to said set of predictive distributions is the conditional distribution for at least one latent attribute.

15. Method according to claim 1, characterized in that at least one predictive distribution belonging to said set of predictive distributions is a combination of the conditional distribution for at least one domain attribute and the conditional distribution for at least one latent attribute.

16. Method according to claim 1, characterized in that the number of dimensions used in the step of generating a visual representation is one.

17. Method according to claim 1, characterized in that the number of dimensions used in the step of generating a visual representation is two.

18. Method according to claim 1, characterized in that the number of dimensions used in the step of generating a visual representation is three.

19. Method according to claim 1, characterized in that in said step of determining the visual locations, said visual locations are determined by pairwise distances between data vectors to be visualized, where the pairwise distances are computed by using at least one predictive distribution belonging to said set of predictive distributions.

20. Method according to claim 19, characterized in that in said step of determining the visual locations, a technique known as Sammon's mapping is used.

21. Method according to claim 19, characterized in that said set of predictive distributions comprises a conditional distribution and the pairwise distance between a first data vector and a second data vector is the symmetric Kullback-Leibler-distance between a first instance of the conditional distribution, where the conditional variables are assigned the values present in the first data vector, and a second instance of the conditional distribution, where the conditional variables are assigned the values present in the second data vector.

22. Method according to claim 19, characterized in that said set of predictive distributions comprises a conditional distribution and the pairwise distance between a first data vector and a second data vector is defined using at least the probability that a first random outcome drawn from a first instance of the conditional distribution, where the conditional variables are assigned the values present in the first data vector, is different from a second random outcome drawn from a second instance of the conditional distribution, where the conditional variables are assigned the values present in the second data vector.

23. Method according to claim 19, characterized in that in said step of determining the visual locations, a technique known as Sammon's mapping is used.

24. Method according to claim 23, characterized in that said set of probabilistic models comprises a naive Bayes model.

25. Method according to claim 1, characterized in that said set of predictive distributions comprises a first conditional distribution for first domain attribute(s) and a second conditional distribution for second domain attribute(s), and in that in said step of determining the visual locations, said visual locations are determined by pairwise distances between data vectors to be visualized, where the pairwise distances are computed by using at least the first conditional distribution and the second conditional distribution.

26. Method according to claim 25, characterized in that said set of probabilistic models comprises a first probabilistic model and a second probabilistic model, and the first conditional distribution is related to the first probabilistic model and the second conditional distribution is related to the second probabilistic model.

27. Method according to claim 1, characterized in that in said step of determining the visual locations, the visual locations are determined by defining a coordinate system where each dimension represents one component of an instance of a predictive distribution belonging to said set of predictive distributions.

28. Method according to claim 1, characterized in that said set of probabilistic models consists of one probabilistic model.

29. Method according to claim 1, characterized in that said set of predictive distributions consists of one predictive distribution.

30. A visualization system, which comprises means for receiving data to be visualized, characterized in that it further comprises
   means for constructing a set of probabilistic models using predetermined probabilistic model structures,
   means for generating a set of predictive distributions from said set of probabilistic models,
   means for determining, using at least one predictive distribution belonging to said set of predictive distributions, visual locations for data vectors, which constitute at least part of the data to be visualized, and
   means for producing a visualization using said visual locations.

31. A visualization system according to claim 30, characterized in that it further comprises means for storing the probabilistic model structures.

32. A visualization system according to claim 30, characterized in that it further comprises means for providing a user interface.

33. A visualization system according to claim 30, characterized in that it further comprises means for displaying said visualization.

34. A visualization system according to claim 30, characterized in that it further comprises means for storing said visualization on a computer-readable medium.

35. A visualization system according to claim 30, characterized in that the means for constructing a set of probabilistic models, the means for generating a set of predictive distributions, the means for determining visual locations and the means for producing a visualization are realized as program instructions stored in a memory medium and in that the visualization system further comprises a processing unit for executing the program instructions.

* * * * *